United States Patent [19]

Doke et al.

[11] Patent Number: 5,111,006
[45] Date of Patent: May 5, 1992

[54] SWITCH DEVICE FOR POWER DRIVEN SEAT

[75] Inventors: Harumi Doke; Syozi Ishida; Hiroki Iwasa; Chikao Nagasaka; Masuyuki Ueda; Shigeru Kato; Hisashi Aoki; Makoto Shibahara; Satoshi Mori, all of Aichi, Japan

[73] Assignee: Kabushiki Kaisha Toka-Rika-Denki-Seisakusho, Aichi, Japan

[21] Appl. No.: 520,757

[22] Filed: May 9, 1990

[30] Foreign Application Priority Data

May 16, 1989 [JP] Japan ............................... 1-56025[U]
Nov. 30, 1989 [JP] Japan ............................. 1-139179[U]

[51] Int. Cl.⁵ ............................................... H01H 9/00
[52] U.S. Cl. ................................ 200/5 R; 200/6 R
[58] Field of Search .................... 200/1, 2, 3, 4, 5, 6, 200/7, 8, 9, 10, 11, 12, 13, 14, 15, 16, 17, 18

[56] References Cited

U.S. PATENT DOCUMENTS 4,454,390 6/1984 Gmeiner et al. ..................... 200/6 R
4,695,682 9/1987 Winogrocki ......................... 200/5 R Primary Examiner—Harold Broome
Attorney, Agent, or Firm—Sixbey, Friedman Leedom & Ferguson

[57] ABSTRACT

A switch device for a power driven seat of a vehicle wherein the position of the seat is adjusted by the driving force of a motor. A first control knob three-dimensionally representing the shape of the seat cushion and a second control knob three-dimensionally representing the shape of the seat back are provided. These knobs are capable of moving relative to each other, and the movement of each of the knobs by an occupant is detected by a limit switch. Therefore, when the passenger intends to move each portion of the seat, it is necessary to move the first and the second control knobs in the desired direction of the seat. As a result, the seat is moved.

22 Claims, 8 Drawing Sheets

SWITCH DEVICE FOR POWER DRIVEN SEAT

BACKGROUND OF THE INVENTION

1. Field of the Invention

The present invention relates to a switch device for use in a vehicle arranged in such a manner that the position of a seat cushion thereof and that of a seat back thereof are adjusted by the driving power of a motor, the switch device being arranged to be operated by an occupant so as to control the above-described motor.

2. Background Information

There are vehicles which are equipped with power driven seats which can be moved by an electric force. The mechanisms of the type described above and which can be electrically driven are exemplified by a slide mechanism for moving the seat cushion in the longitudinal direction of the vehicle, a reclining mechanism for tilting the seat back, a front vertical mechanism for vertically moving the front end portion of the seat cushion and a rear vertical mechanism for vertically moving the rear end portion of the seat cushion. In addition to the above-described basic power seat mechanisms, some vehicles are equipped with head restraint and/or side support mechanisms for supporting the side of the occupant.

The control switches for operating the above-described mechanisms are arranged in such a manner that a control knob for operating the slide mechanisms and that for operating the vertical mechanism are disposed on the side surface of the seat cushion. On the other hand, a control switch for the reclining mechanism is disposed on the side surface of the seat back.

However, the operating directions of the control switch of the type described above do not coincide with the actual movement directions of the seat. In addition, since the positions of the control switches are not integrated, the obtainable handling facility has been unsatisfactory. Although some structures have been arranged such that a variety of control switches are integrally disposed in a center console or the like of the vehicle, it is necessary to select one control switch from a plurality of control switches of the same shape. Therefore, an error can occur when the desired control switch is selected by an operator.

Accordingly, a power seat has been disclosed in, for example, Japanese Utility Model Laid-Open No. 59-103331 in which the switch for the slide mechanism and that for a reclining mechanism are integrally disposed on the side surface of the seat cushion and control knobs capable of switching the contacts of the switches are allowed to project from the side surface of the seat cushion. The control knob for the slide mechanism can be operated in the longitudinal direction of the vehicle so as to coincide with the actual movement direction of the seat cushion. Furthermore, the control knob for the reclining mechanism is rotated and centered in the traverse direction of the vehicle so as to coincide with the actual movement direction of the seat back. Therefore, the occupant can correctly select a desired switch so that an erroneous operation can be prevented.

Another power switch has been disclosed in, for example, Japanese Patent Laid-Open No. 55-29694 in which the switch for the slide mechanism and that for the reclining mechanism are disposed on the door of the vehicle and control knobs capable of switching the contacts of the switches are allowed to project into the vehicle compartment over the door trim. The above-described control knobs are disposed to form a substantially L-shape configuration so as to represent the shape of the passenger seat for a vehicle. Therefore, the control knob for the slide mechanism is operated in the longitudinal direction so as to coincide with the actual movement direction of the seat cushion. The control knob for the reclining mechanism is rotated and centered in the traverse direction of the vehicle so as to coincide with the actual movement direction of the seat back. Therefore, the occupant can move the seat cushion and the seat back without fear of an erroneous operation. As for relative structures, see Japanese Patent Laid-Open no. 60-244621 and Japanese Patent Laid-Open No. 60-236409.

However, although the operating directions of the control knobs of the conventional power switches of the type described above can be made to coincide with the actual movement directions of the passenger seat, the handling facility has been unsatisfactory since the control knobs are arranged vertically on the surface on which the same are mounted and the occupant cannot thereby smoothly operate the control knobs. In addition, the operating directions of the conventional power seat switch structures as described above are limited to the two-dimensional directions. Therefore, the other mechanisms such as the side support mechanism and the thigh support mechanism cannot be integrated.

Since the control knobs for the power seat switches disposed on the side surface of the seat cushion cannot be visually confirmed by the occupant who is normally sitting on the seat, the handling facility is unsatisfactory. On the other hand, according to the power seat switch disposed on the surface of the vehicle door, the seat cushion and the door are relatively moved toward each other at the time of moving the seat cushion. Therefore, the position of the control knob is undesirably changed after the seat cushion has been moved. Therefore, if the seat cushion is moved a long distance, the handling facility is critically deteriorated.

SUMMARY OF THE INVENTION

Accordingly, an object of the present invention is to provide a power driven seat for a vehicle in which control knobs for moving the power seat are integrally disposed thereby improving handling facility by making the control knobs to represent the shape of the seat and by making the directions in which the control knobs are operated to coincide with the actual movement directions of the power driven seat.

According to the present invention, a first control knob and the second control knob each shape of which to represent the seat cushion and the seat back are three-dimensionally formed. The above-described knobs are moved relative to each other and a plurality of switches for detecting the movements are provided. Therefore, when the occupant moves a portion or the whole body of the first and second control knobs formed in the reduced shape of the seat in the direction in which the seat is desired to be moved, the switch detects the movement of the knob so that the seat is moved. Therefore, the occupant can easily determine the directions of the control knobs.

Other and further objects, features and advantages of the invention will be appear more fully from the following description.

DESCRIPTION OF THE PREFERRED EMBODIMENTS

First Embodiment

Figure 1:
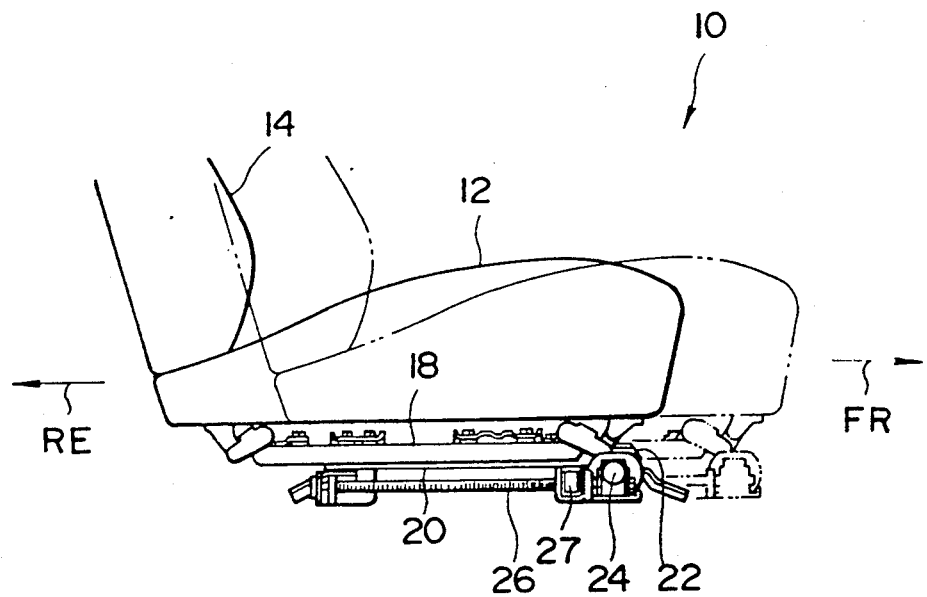
FIG. 1 is a cross sectional view which illustrates a longitudinal directional slide mechanism for a vehicle seat to which the present invention is applied.

FIGS. 1 to 4 illustrate a seat 10 for a vehicle according to a first embodiment of the present invention. The seat 10 comprises a seat cushion 12 and a seat back 14 which are connected to each other via a connecting pipe 16 (see FIG. 4) in such a manner that the seat cushion 12 and the seat back 14 are relatively rotated to each other. An upper rail 18 is fastened to the lower surface of the seat cushion 12, the upper rail 18 being supported by a lower rail 20 secured to the floor surface of the vehicle. The structure is arranged such that the upper rail 18 and the lower rail 20 can be moved relative to each other in the longitudinal direction of the vehicle. As a result, the seat cushion 12 can be slid in the longitudinal direction of the vehicle.

As shown in FIG. 1, a motor 24 is fastened to the upper rail 18 via a bracket 22. A screw 26 rotatably supports the upper rail 18 and is arranged to be rotated by the motor 24. A nut 27 secured to the lower rail 20 is threaded onto the intermediate portion of the screw 26. Therefore, when the motor 24 is operated, the position at which a worm gear and the screw 26 are engaged is moved. As a result, the seat cushion 12 is moved in the longitudinal direction (directions designated by arrows FR and RE) of the vehicle (slide mechanism).

Figure 2:
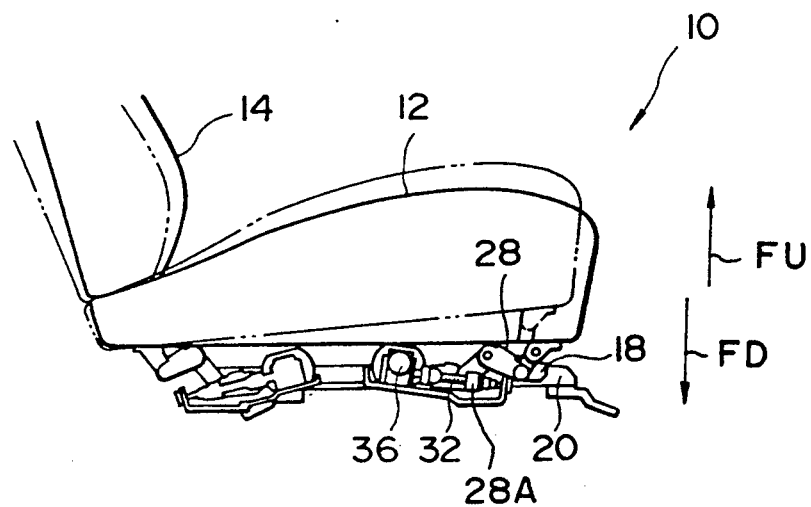
FIG. 2 is a cross sectional view which illustrates a mechanism for vertically moving the front end portion of a vehicle seat to which the present invention is applied.
Figure 3:
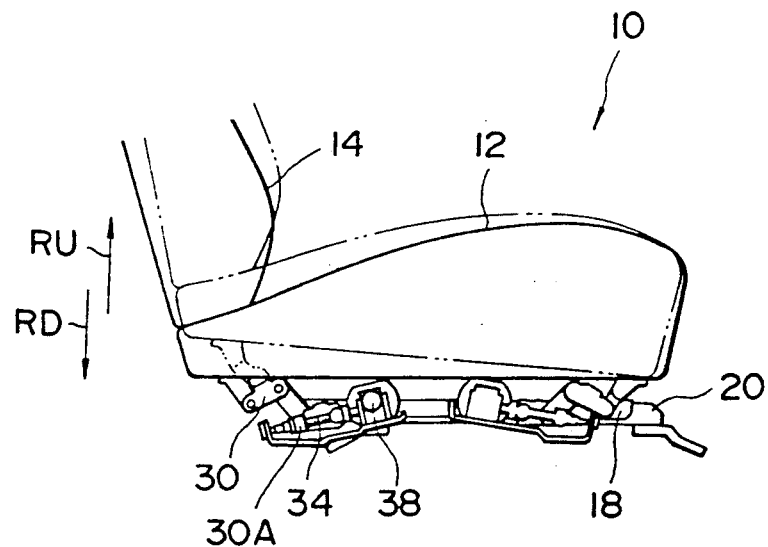
FIG. 3 is a cross sectional view which illustrates a mechanism for vertically moving the rear end portion of a vehicle seat to which the present invention is applied.

As shown in FIGS. 2 and 3, the seat cushion 12 and the upper rail 18 are supported in the longitudinal direction of the vehicle via corresponding link mechanisms 28 and 30. The link mechanisms 28 and 30 respectively comprise a plurality of links. The end portions of the links 28 and 30 adjacent to the upper rail 18 are threaded to screws 32 and 34 via securing nuts 28A and 30A. Since the nuts 28A and 30A are moved in the axial directions of the screws 32 and 34 by a driving force of motors 36 and 38, the end portion of the link 28 adjacent to the seat cushion 12 is moved in the vertical direction of the vehicle. Therefore, when the front-side motor 36 is driven, the seat cushion 12 is tilted centering the rear end portion of the seat cushion 12 (a front vertical mechanism for moving in directions designated by arrows FU and FD shown in FIG. 2). The seat cushion 12 is tilted centering the front end portion of the seat cushion 12 (a rear vertical mechanism for moving in directions designated by arrows RU and RD shown in FIG. 3) when the rear-side motor 38 is operated.

Figure 4A:
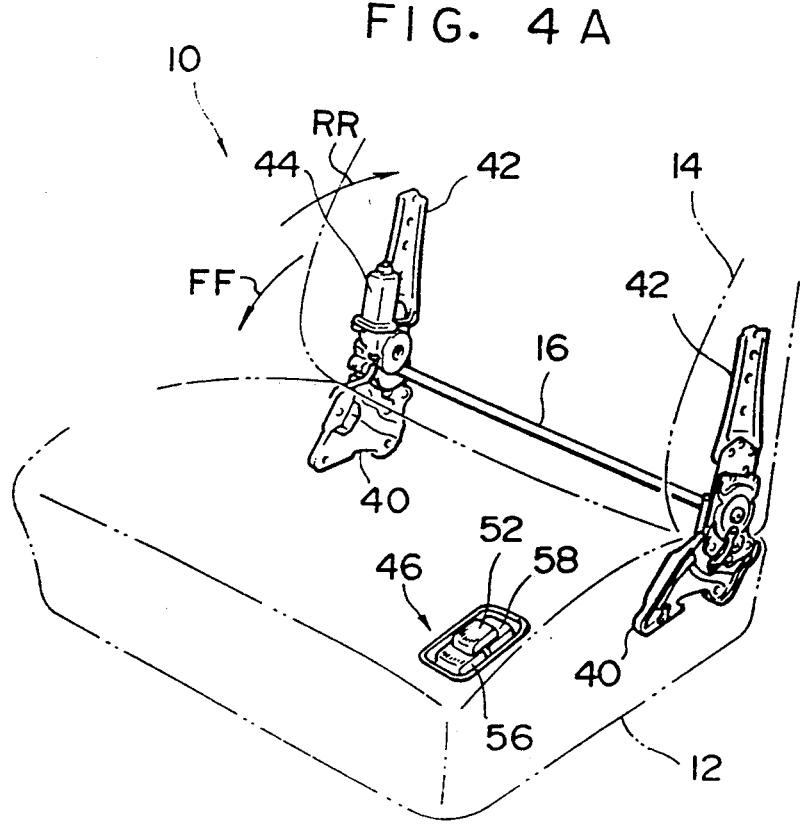
FIG. 4A is a perspective view which illustrates a seat back reclining mechanism and a control switch unit portion for a vehicle seat to which the present invention has been applied.

As shown in FIG. 4A, the seat cushion 12 and the seat back 14 are connected to each other by brackets 40 and 42 an axially supporting connecting pipe 16. An end portion of the connecting pipe 16 is connected to a motor 44 via a reduction mechanisms comprising gears, while the other end portion is secured to the seat back 14. Therefore, when the motor 44 is driven, the seat back 14 can be tilted (in directions designated by arrows FF and RR shown in FIG. 4) with respect to the seat cushion 12 (a reclining mechanism).

Figure 4B:
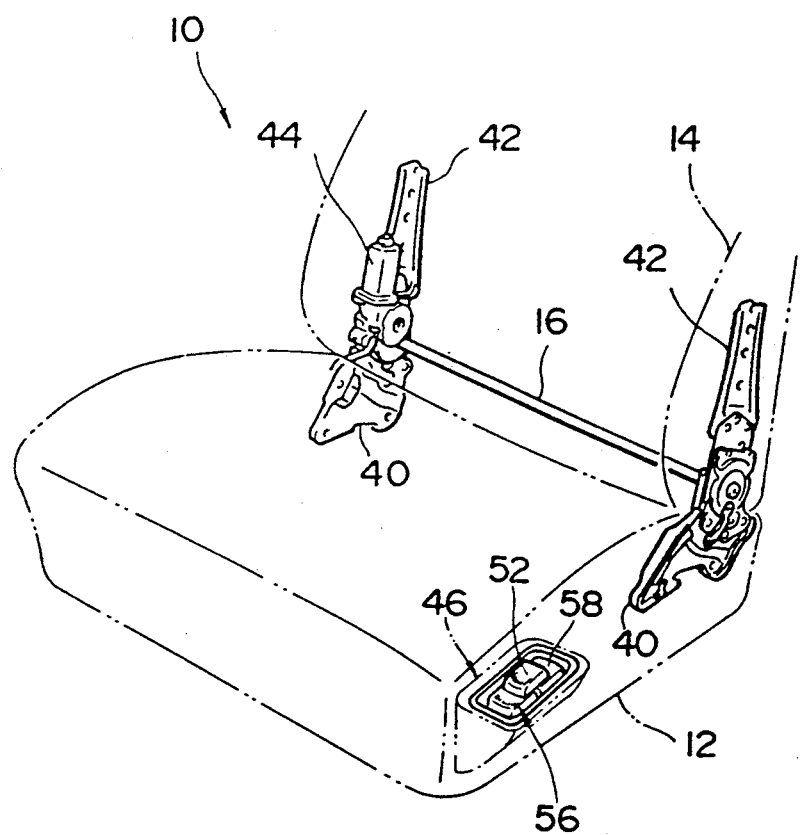
FIG. 4B is a perspective view which illustrates a modification to the control switch unit portion.
Figure 5A:
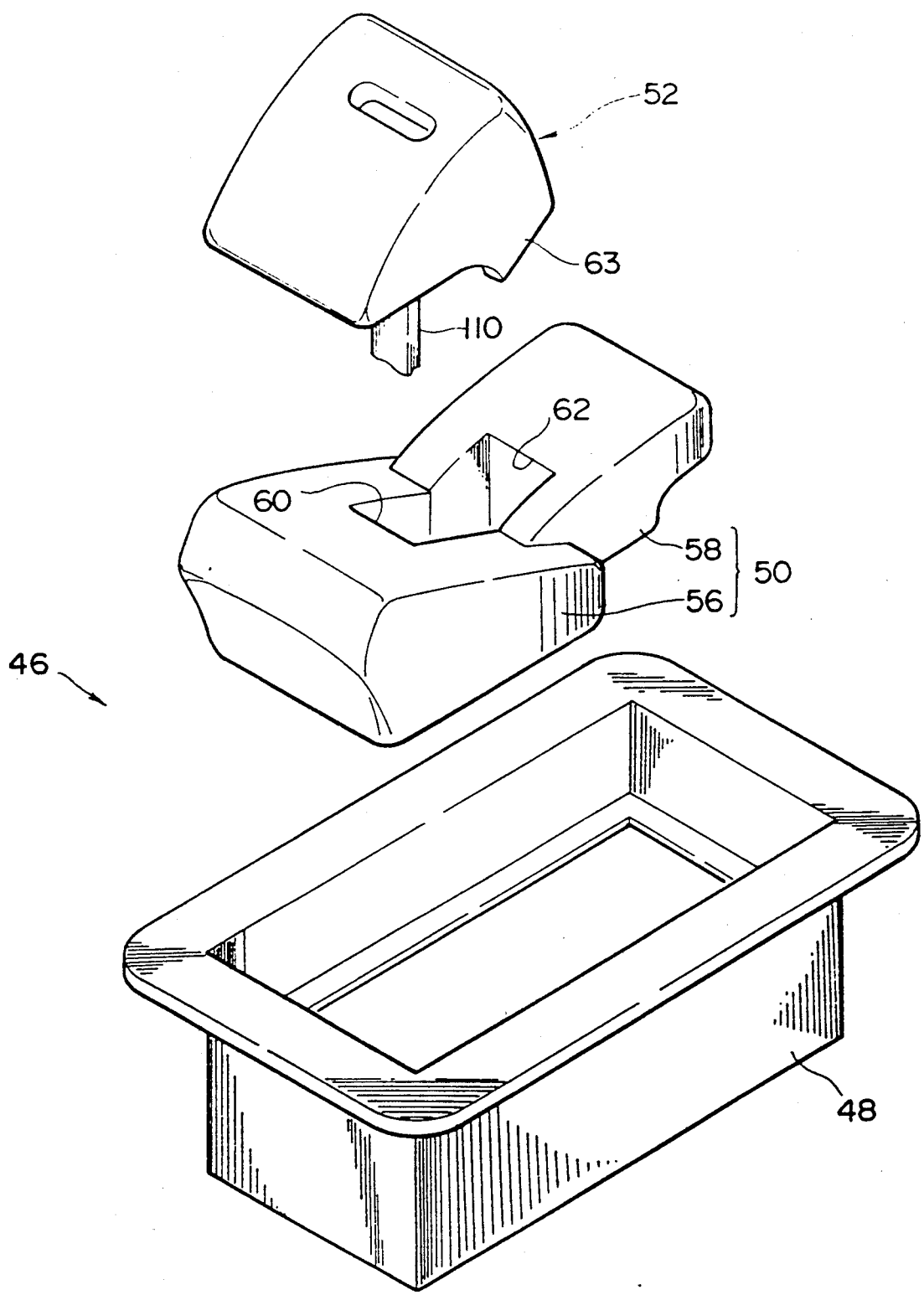
FIG. 5A is an exploded perspective view which illustrates a control knob.
Figure 6:
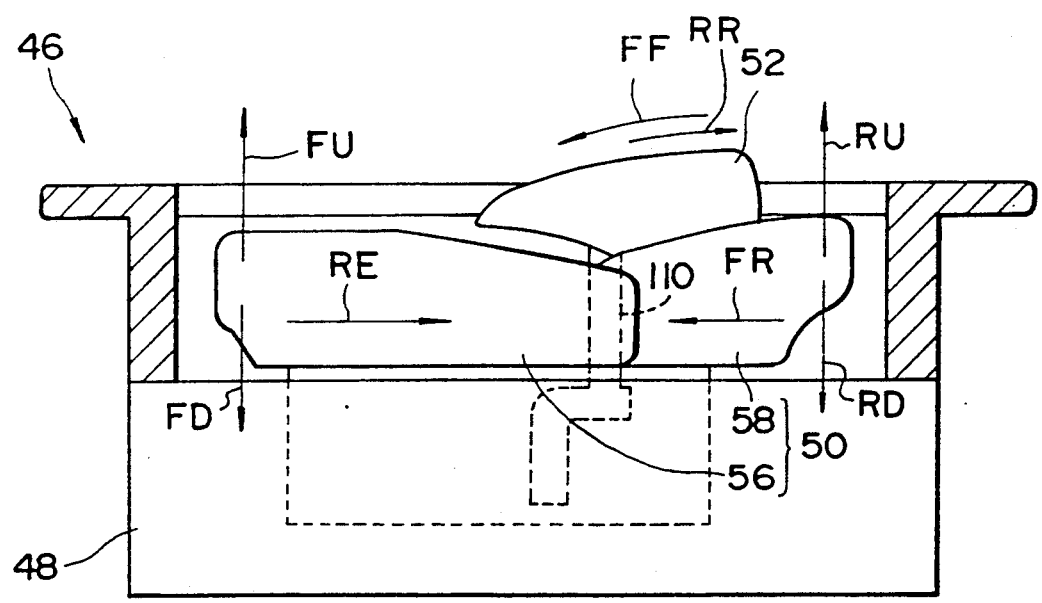
FIG. 6 is a partial cross sectional view which illustrates a control knob and a control switch unit portion.
Figure 7:
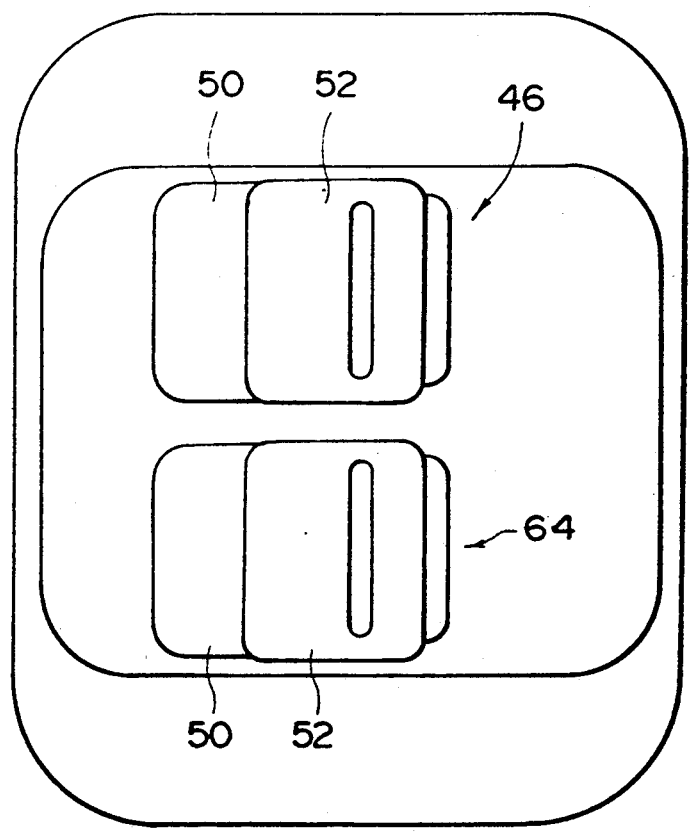
FIG. 7 is a plan view which illustrates a modification to the control knob in which knobs for the driver's seat and knobs for the passenger's seat are disposed integrally.

As shown in FIG. 4A, a control switch unit 46 is fastened to the upper surface of the front portion of the seat cushion 12. The control switch unit 46 drives the motors 24, 36, 38 and 44 which are provided for the corresponding mechanisms described above. As shown in FIG. 5A and 6, the control switch unit 46 is provided with a contact unit 48 which: includes a pair of contacts for rotating the motor 24 of the slide mechanism in a forward or reverse direction; a pair of contacts for rotating the motor 36 of the front vertical mechanism in a forward or reverse direction; a pair of contacts for rotating the motor 38 of the rear vertical mechanism in a forward or reverse direction; and a pair of contacts for rotating the motor 44 of the reclining mechanism in a forward or reverse direction. The structure of the above-described contact unit 48 will be described later. The control unit 46 can be, as shown in FIG. 4B, integrally fastened to the side of the seat cushion 12.

A first control knob 50 and a second control knob 52 are placed on the top end portion of the contact unit 48 so that each of the contacts is independently switched by the operation of the first and the second control knobs 50 and 52 in their predetermined directions.

The first control knob 50 is designed in the form of a shape represented to the seat cushion 12, the first control knob 50 comprising a front control knob 56 and a rear control knob 58 which are connected to each other. The front control knob 56 and the rear control knob 58 are movable in both the vertical direction and the longitudinal direction of the vehicle. Therefore, when the front control knob 56 is moved in the rearward direction of the vehicle (in a direction designated by an arrow RE shown in FIG. 6), the contact is switched so as to cause the motor 24 of the seat cushion mechanism to be forwardly rotated. When it is moved in the vertical direction of the vehicle (in directions designated by arrows Fu and FD shown in FIG. 6), the contact is switched so as to cause the motor 36 of the front vertical mechanism to be reversely rotated.

When the rear control knob 58 is moved in the forward direction of the vehicle (in a direction designated by an arrow FR shown in FIG. 6), the contact is switched so as to cause the motor 24 of the seat cushion mechanism to be reversely rotated. When it is moved in the vertical direction of the vehicle (in directions designated by arrows RU and RD shown in FIG. 6), the contact is switched so as to cause the motor 38 of the rear vertical mechanism to be rotated in the forward or reverse direction.

As shown in FIG. 5(A) the front control knob 56 and the rear control knob 58 have recessed portions 60 and 62 formed at their connection portions. A connection member 110 extending from the second control knob 52 penetrates the above-described recessed portions 60 and 62. The second control knob 52 is designed in the form of a shape represented to the seat back 14. When the second control knob 52 is tilted in the longitudinal direction of the vehicle (directions designated by arrows FF and RR of FIG. 6), the contact is switched so as to cause the motor 44 of the reclining mechanism to be rotated in a forward or reverse direction. A downward rib 63 is formed in the traverse direction of the second control knob 52 so as to confront the side surface of the rear control knob 58. As a result, a gap created between the second control knob 52 and the rear control knob 58 is covered.

The above-described front control knob 56 and rear control knob 58 of the first control knob 50 and the second control knob 52 are respectively held by control-knob neutral maintaining means to be described later in a normally-open state. Therefore, all of the contacts are turned off when no operation is conducted.

Now, the structure in the contact unit 48 will now be described.

Figure 5B:
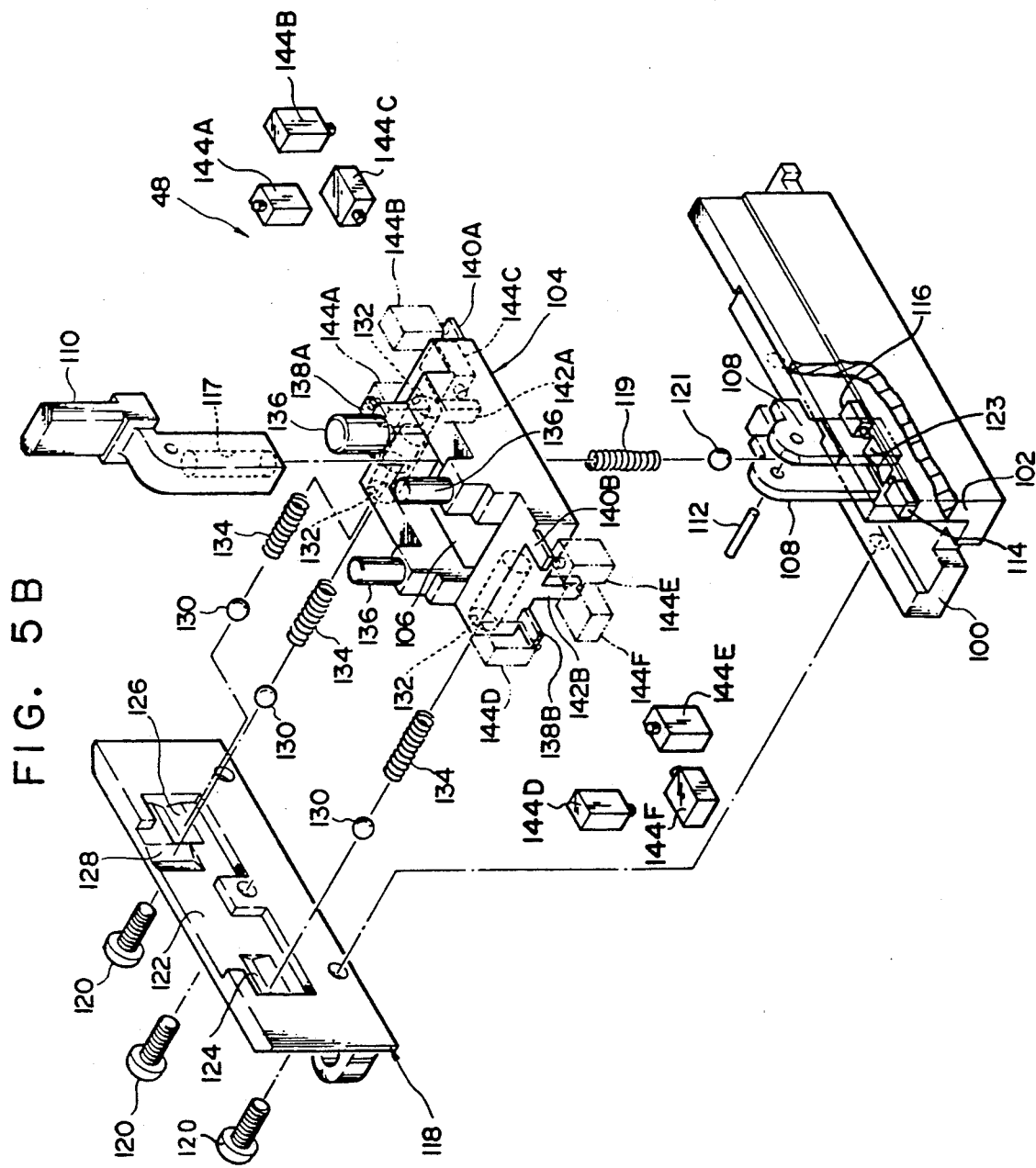
FIG. 5B is an exploded perspective view which illustrates a control switch unit portion.

As shown in FIG. 5B, a side wall 102 stands erect along the longer side at a traverse directional end of a base 100 of the contract until 48. A slider 104 is placed on the base 100. The slider 104 has a rectangular hole 106 in its center portion through which a pair of flanges 108 formed on the base 100 penetrates. The connection member 110 connected to the second control knob 52 (not shown) is connected between the two flanges 108 via a pin 112.

The lower end portion of the connection member 110, when viewed in FIG. 5B, is disposed between a pair of limit switches 114 and 116 fastened to the base 100. When the connection member 110 is rotated relative to the pin 112, the contact of the limit switch 114 or that of the limit switch 116 is switched.

A hole 117 extending from the lower surface of the connection member 110 is formed in the connection member 110 so that a ball 121 forming the control knob neutral maintaining means is accommodated via a compression coil spring 119. The thus accommodated ball 121 is guided to the deepest portion of a V-groove 123 formed in the base 100 by the urging force of the compression coil spring 119, and is maintained at a position in which it is not in contact with any of the limit switches 114 and 116, that is a in neutral position.

A guide plate 118 is fasten to the longer side of the base 100 opposite to the side on which the side wall 102 is formed by a screw 120. As a result, the slider 104 is held between the side wall 102 and the guide plate 118.

A groove 122 is formed on a surface of the guide plate 118 which confronts the slide 104. The side surface of the slider 104 is brought into contact with the bottom surface of the groove 122. The area of opening of the groove 122 is arranged to be slightly larger than the side area of the slider 104. As a result, the slider 104 is moved freely in the groove 122 but the separation of the same is prevented.

V-shape recessed portions 124, 126 and 128 each of which is formed by surfaces inclined with respect to the bottom surface are formed in the bottom surface of the groove 122. The recessed portions 124, 126 and 128 act to respectively limit the vertical movement of the front control knob 56, the vertical movement of the rear control knob 58 and the movement of the first control knob 50 in the sliding direction. A ball 130 is placed to correspond to each of the recessed portions 124, 126 and 128, the ball 130 forming the control knob neutral maintaining means similar to the ball 121. Each of the balls 130 is accommodated in a hole 132 via a compression spring 134. The balls 130 are urged in the direction in which the balls 130 are separated from the holes 132, that is, the direction toward the bottom surface of the groove 122 of the guide plate 118. The balls 130 are guided onto the V-shaped surface of each of the recessed portions 124, 126 and 128 inclined with respect to the bottom surface of the groove 122. The ball is thereby held in the deepest portions.

There are three erect pins 136 on the upper surface of the slider 104. The first control knob 50 is fastened to the three pins 136.

Two tongue plates 138A and 140A extending horizontally and a tongue plate 142A extending vertically are formed at the rear end portion of the slider 104. The tongue plates 138A, 140A and 142A respectively correspond to limit switches 144A, 144B and 144C so that the contact of each of the limit switches 144A, 144B and 144C is switched in accordance with the movement of the slider 104. Furthermore, limit switches 144D, 144E and 144F respectively correspond to the horizontal tongue plates 138B and 140B and the vertical tongue plate 142B which projects over the front end portion of the slider 104. The slider 104 is positioned at a neutral position at which it does not come in contact with any of the limit switches 144A to 144F since the balls 130 are respectively positioned in the deepest portions of the above-described V-shaped recessed portions 124, 126 and 128.

The operation of the first embodiment will now be described.

When it is desired to move the seat cushion 12 in the forward direction of the vehicle, the rear control knob 58 of the first control knob 50 is moved in the forward direction (the direction designated by an arrow FR shown in FIG. 6) of the vehicle. As a result, the contact of the limit switch 144F in the contact until 48 is switched so that the motor 24 is rotated forwards. When the motor 24 is rotated forwards, the screw 26 threaaded on the nut 27 is moved in the forward direction of the vehicle along the axis of the screw 26. The seat cushion 12 is thereby slid in the forward direction of the vehicle. In this case, when an occupant releases the rear control knob 58, the ball 130 is guided into the deepest portion in the V-shaped recessed portion 128, and the ball 130 is automatically returned and held at the neutral position. The balls 130 are guided by the recessed portions 124, 126 respectively during the forward and rearward movement of the first control knob 56. Then the knob 50 is operated smoothly and does not move up and down unintentionally.

When the rear control knob 58 is moved in the upward direction (in the direction designated by an arrow RU shown in FIG. 6) of the vehicle, the contact of the limit switch 144B is switched so that the motor 38 is rotated forwards. In this case, the slider 104 is rotated around the ball 130 in the recessed portion 124. When the motor 38 is rotated forwards, the link 30 is driven so that the rear corner of the seat cushion 12 is raised. When the rear control knob 58 is pressed in the downward direction (the direction designated by an arrow RD shown in FIG. 6) of the vehicle, the contact of the limit switch 144A is switched so that the motor 38 rotates in the reverse direction. When the motor 38 rotates in the reverse direction, the link 30 is driven to move the rear corner of the seat cushion 12 downwards. In this case too, when the occupant releases the rear control knob 58, the ball 130 is guided into the deepest portion of the V-shape recessed portion 126, and automatically positioned and held in a neutral position.

In order to move the seat cushion on 12 in the rearward direction of the vehicle, the front control knob 56 of the first knob 50 is moved in the forward direction (in the direction designated by an arrow RE shown in FIG. 6) of the vehicle. In this case, balls 130 are guided in the recessed portion 124, 126 respectively. Then the first control knob 56 moves forward and rearward in stable condition. As result, the contact of the limit switch 144C in the contact unit 48 is switched so that the motor 24 is rotated in the reverse direction. When the motor 24 is rotated in the reverse direction, the worm gear is moved in the rearward direction of the vehicle along the axis of the screw 26. As a result, the seat cushion 12 is slid in the rearward direction of the vehicle. Also in this case, when the occupant releases the front control knob 56, the ball 130 is guided into the deepest portion of the V-shaped recessed portion 128, and automatically positioned and held at the neutral position.

On the other hand, when the front control knob 56 is raised in the upward direction (in the direction designated by an arrow RU shown in FIG. 6) of the vehicle, the contact of the limit switch 144D is switched so that the motor 36 is rotated forwards. In this case, the first control knob 50 and the slider 104 rotate around the ball 130 in the recessed portion 126. When the motor 36 is rotated forwards, the link 28 is driven so that the front corner of the seat cushion 12 is raised. When the front control knob 56 is pressed in the downward direction (in the direction designated by an arrow FD shown in FIG. 6) of the vehicle, the contact of the limit switch 144E is switched so that the motor 36 is rotated in the reverse direction. When the motor 36 is rotated in the reverse direction, the link 28 is driven. As a result, the front corner of the seat cushion 12 is moved downwards. Also in this case, when the occupant releases the front control knob 56, the ball 130 is guided into the deepest portion of the V-shaped recessed portion 124, and is automatically positioned and held at a neutral position.

When the second control knob 52 is tilted in the forward direction (in the direction designated by an arrow FF shown in FIG. 6) of the vehicle, the contact of the limit switch 116 in the contact unit 48 is switched so that the motor 44 is rotated forwards. When the motor 44 is rotated forwards, the connecting pipe 16 is rotated by the reduction mechanism so that the seat back 14 is tilted in the forward direction of the vehicle. When the second control knob 52 is tilted in the rearward direction (in the direction opposite to the arrow RR shown in FIG. 6), the contact of the limit switch 114 in the contact unit 48 is switched so that the motor 44 is rotated in the reverse direction. When the motor 44 is rotated in the reverse direction, the connecting pipe 16 is rotated via the reduction mechanism so that the seat back 14 is tilted in the rearward direction of the vehicle.

In this case, when the occupant releases the second control knob 52, the ball 121 is guided into the deepest portion of the V-shape groove 123, and is automatically positioned and held at a neutral position.

As described above, since all of the operating directions coincide with the actual movement directions, the occupant can smoothly and integrally operate the control knobs. Furthermore, since the first control knob 50 is represented to the seat cushion 12, while the second control knob 52 is represented to the seat back 14, the handling facility is improved. In addition, when the occupant releases each of the control knobs, the control knobs are guided into either the deepest portions of the V-shaped grooves 123 or the V-shape recessed portions 124, 126 and 128, and is held at a position at which it is not brought into contact with any of the limit switches, that is at the neutral position. Therefore, it is necessary for the occupant to move the control knob in the direction in which the seat is desired to be moved. As a result, handling facility is significantly improved.

According to the first embodiment, since the control switch unit 46 is fastened to the seat cushion 12, the positional relationship between the seat cushion 12 and the control switch unit 46 is maintained even if the seat cushion 12 has been slid. Therefore, handling facility is further improved. However, the present invention is not limited to the above-description. For example, the control unit 46 may be fasten to a center console at which the movement of the seat cushion 12 is not hindered.

According to the first embodiment, the V-shape recessed portions 124, 126 and 128 are formed in the bottom surface of the groove 122 and the ball 130 and compression spring 134 are disposed on one side of the slider 104. However, the present invention is not limited to this structure. For example, the V-shape recessed portion may be formed in the side wall 102, and the ball 130 and the compression coil spring 134 may be disposed on another side surface of the slider 104. In this case, since the slider 104 is further assuredly moved, handling facility of each of the control knobs and handling feeling of the same is further improved.

According to the first embodiment, the control switches for the slide mechanism, the vertical mechanism and the reclining mechanism are provided for the control switch unit 46. However, a control switch for a mechanism for tilting the headrest and a side support mechanism and the like may be provided for the same.

Second Embodiment

A second embodiment of the present invention will now be described with reference to FIGS. 8 and 9. The same elements as those according to the first embodiment are given the same reference numerals and their descriptions are therefore omitted.

Figure 8:
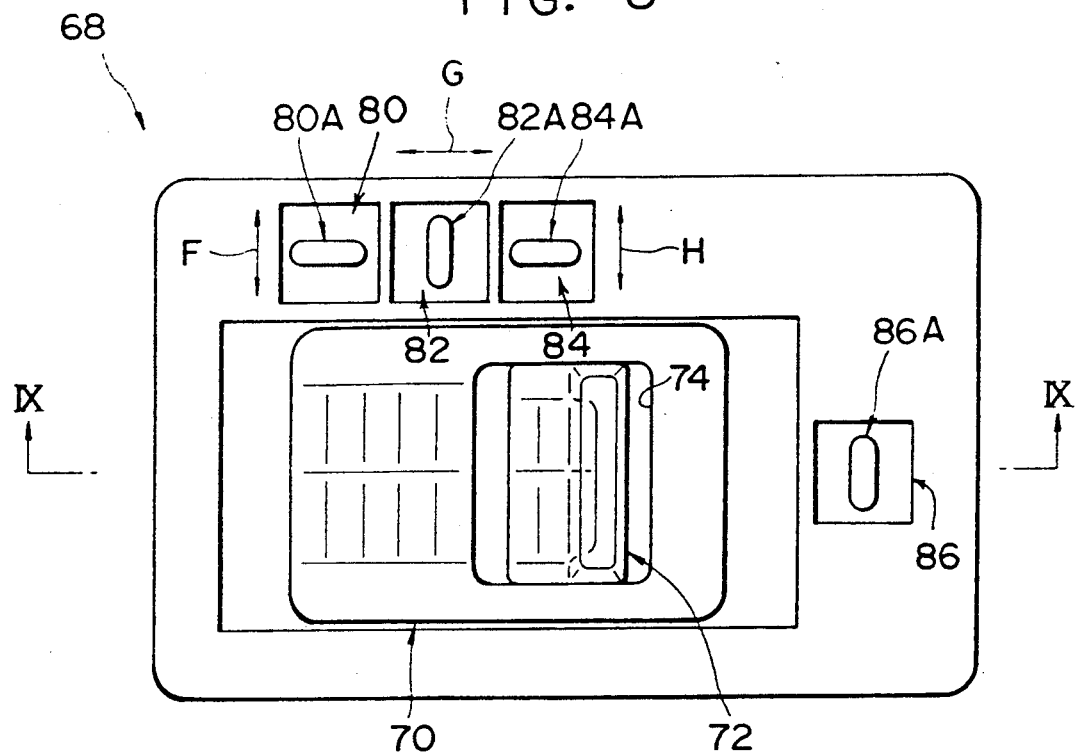
FIG. 8 is a plan view which illustrates a modification in which a sub-switch is provided.

As shown in FIG. 8, a first control knob 70 and a second control knob 72 are positioned on the upper end portion of the contact unit 48 of a control switch unit 68. As a result, the contacts can be individually switched by moving the first and the second control knobs 70 and 72 in predetermined directions. The internal structure of the contact unit 48 is arranged to be substantially the same as that in the first embodiment.

The first control knob 70 is represented to the seat cushion 12, and is capable of moving in the vertical direction and the longitudinal direction of the vehicle. Therefore, when the first control knob 70 is moved in the rearward direction (in the direction designated by an arrow RE shown in FIG. 9) of the vehicle, the contact can be switched so as to cause the motor 24 of the seat cushion mechanism to rotate forward. When the first control knob 70 is moved in the forward direction (in a direction designated by an arrow FR shown in FIG. 9) of the vehicle, the contact is switched so as to cause the motor 24 of the seat cushion mechanism to be rotated in the reverse direction.

When the front portion of the first control knob 70 is moved in the vertical direction (in directions designated by arrows FU and FD shown in FIG. 9) of the vehicle, the contact is switched so as to cause the motor 36 of the front vertical mechanism to be rotated in the forward or reverse direction. When the rear portion of the same is moved in the vertical direction (in the direction designated by arrows RU and RD shown in FIG. 9) of the vehicle, the contact is switched so as to cause the motor 38 of the rear vertical mechanism to be rotated in the forward or reverse direction. The above-described contacts are disposed in the above-described contact unit 48.

A recessed portion 74 is formed in such a manner that the second control knob 72 projects therethrough. The second control knob 72 is represented to the seat back 14. A sub-contact unit 76 is formed on the bottom portion of the recessed portion 74, the sub-contact unit 76 having a contact which is switched when the second control knob 72 is operated. When the second control knob 72 is moved in the longitudinal direction (in directions designated by arrows FF and RR shown in FIG. 9) of the vehicle in the recessed portion 74, the contact is switched so as to cause the motor 44 of the reclining mechanism to be rotated in the forward or reverse direction. A hole 78 is formed in the bottom of the recessed portion 74 so as to serve as a passage through which signal lines 79 extending from the two terminals of the contact in the sub-contact unit 76 passes.

In the vicinity of the first control knob 70 and the second control knob 72, the following sub-switches are disposed: a thigh support adjustment switch 80, a lumbar support adjustment switch 82, a side support adjustment switch 84 and a head restraint adjustment switch 86. All of the switches necessary to adjust each of the portions of the seat 10 are integrally disposed. Each of these switches are arranged in such a manner that each of the contacts are turned on/off by the control knobs 80A, 82A, 84A and 86A. The thigh support is a mechanism for supporting the thigh, the lumbar support is a mechanism for supporting the lumbar, the side support is a mechanism for supporting the traverse directional movement of the sitting occupant. The head restraint is a mechanism for supporting the rearward movement of the head of the occupant. Each of the mechanisms are arranged to be driven by motors (omitted from illustration).

The thigh support adjustment switch 80, the lumbar support adjustment switch 82 and the side support adjustment switch 84 are positioned in a column in the side portion to the first control knob 70. These switches are arranged in such a manner that the operating directions of the control knobs of the neighboring switches are made perpendicular to each other (the operating directions of the control knobs are shown by arrows F, G and H of FIG. 9). The head restraint adjustment switch 86 is disposed in the rearward direction of the first control knob 70.

The operation of the second embodiment will now be described.

To move the seat cushion 12 in the forward direction of the vehicle, the first control knob 70 is moved in the forward direction (in the direction designated by an arrow FR shown in FIG. 9) of the vehicle. As a result, the corresponding contact in the contact unit 48 is switched so that the motor 24 is rotated forwards. The seat cushion 12 is thereby slid in the forward direction of the vehicle.

When the rear portion of the first control knob 70 is moved in the vertical direction (in direction designated by arrows RU and RD shown in FIG. 9) of the vehicle, the corresponding contact is switched, causing the motor 38 to be rotated in the forward or rearwards direction. The rear corner of the seat cushion 12 is thereby raised or moved downwards.

To move the seat cushion 12 in the rearward direction of the vehicle, the front portion of the first control knob 70 is moved in the rearward direction (in a direction designated by an arrow RE shown in FIG. 9) of the vehicle. As a result, the corresponding contact is the contact unit 48 is switched so that the motor 24 is rotated in the reverse direction. The seat cushion 12 is thereby slid in the rearward direction of the vehicle.

When the front portion of the first control knob 70 is moved in vertical direction (in direction designated by arrows FU and FD shown in FIG. 9) of the vehicle, the corresponding contact is switched so that the motor 36 is rotated in the forward or reverse direction. The seat front corner of the seat cushion 12 is thereby raised or moved downwards.

Figure 9:
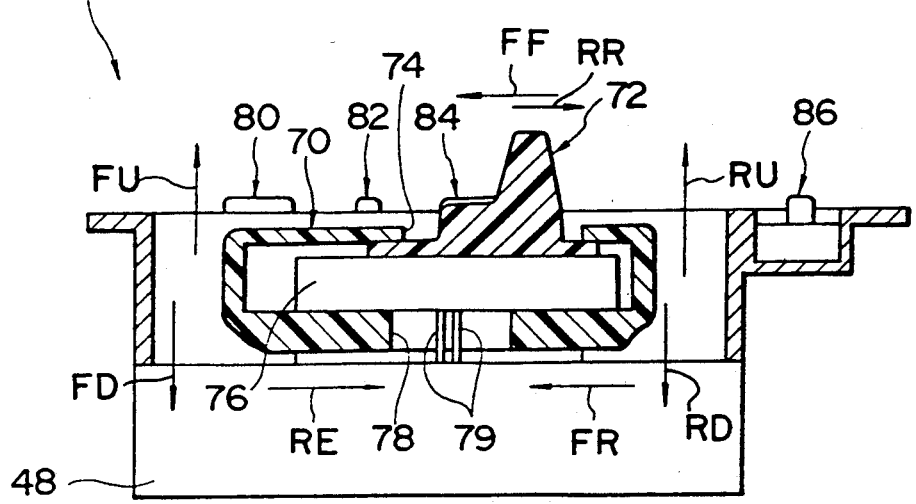
FIG. 9 is a cross sectional view taken along line 9—9 of FIG. 8.

When the second control knob 72 is tilted in the forward direction or the rearward direction (in the direction designated by an arrow FF or an arrow RR shown in FIG. 9) of the vehicle, the corresponding contact in the subcontact unit 76 is switched so that the motor 44 is rotated in the forward or reverse direction. The seat back 14 is thereby tilted in the forward or the rearward direction of the vehicle.

According to the second embodiment, when the first control knob 70 is operated, the second control knob 72 is moved in the same direction. Therefore, the positional relationship between the first control knob 70 and the second control knob 72 can be maintained. As a result, handling facility is significantly improved.

The sub-switches such as the thigh support adjustment switch 80, the lumbar support adjustment switch 82, the side support adjustment switch 84 and the head restraint adjustment switch 86 are disposed in the vicinity of the first control knob 70 and the second control knob 72. Thus, all of the switches necessary to adjust the seat 10 are integrally disposed, and handling facility of the switch is thereby improved.

Furthermore, the above-described sub-switches are arranged in such a manner that the operating directions of the control knobs of the neighboring switches are made perpendicular to each other (as designated by the arrows F, G and H of FIG. 9). Therefore, a desired switch is selected only by touching the surface of the switch with the necessity of visual confirmation eliminated. Therefore, operation error is prevented.

According to this embodiment, although the control switch unit 46 is fastened to the driver's seat and the passenger's seat respectively, both the control switch unit 46 for the driver's seat and a control switch unit 64 for the passenger's seat may be provided for the driver's seat.

Although the invention has been described in its preferred form with a certian degree of particularly, it is understood that the present disclosure of the preferred from has been changed in the details of construction and the combination and arrangement of parts may be resorted to without departing from the spirit and the scope of the invention as hereinafter claimed.

What is claimed is:

1. A switch device for power driven seat of a vehicle having a seat cushion, a seat back and power sources for moving said seat cushion and said seat back, said switch device comprising:
   (a) a first control knob for controlling said seat cushion, having a three-dimensional shape which generally corresponds to and represents the shape of said seat cushion so as to enable an occupant to easily locate and correctly operate said first control knob with a hand;
   (b) a second control knob for controlling said seat back, having a three-dimensional shape which generally corresponds to and represents the shape of said seat back and is capable of relatively moving with respect to said first control knob so as to enable said occupant to easily locate and correctly operate said second control knob by hand;
   (c) a contact unit for supporting each of said first and second control knobs and allowing said first and second control knobs to be movable an operation of said occupant in the same directions as said occupant intends to move said seat cushion and said seat back;
   (d) a connections member for supporting said second knob on said contact unit which penetrates said first control knobs;
   (e) a plurality of switches accommodated in said contact unit for independently detecting the movement of each of said first and second control knobs by the operation of said occupant and actuating power sources for moving said seat cushion and said seat back in accordance with the detected movement of each of said first and second control knobs; and
   (f) a slider accommodated in said contact unit supporting said first control knob to transmit the movement of said first control knob in the forward and rearward directions due to the operation of said occupant in order to enable the detection of the movement of said first control knob by at least one of said plurality of switches by detecting the movement of said slider.

2. A switch device according to claim 1, wherein each of said first and second control knobs is capable of being independently moved.

3. A switch device according to claim 1, wherein said second control knob is supported at said first control knob and is also movable when said first control knob is moved.

4. A switch device according to claim 1, wherein said first and second control knobs and said contact unit are secured to an upward facing portion of said seat cushion, and said first and second control knobs are respectively disposed in positions corresponding to and representing the positions of said set cushion and said seat back.

5. A switch device according to claim 1 further comprising third and fourth control knobs for controlling the form of said seat cushion and said seat back respectively, said third and fourth control knobs disposed adjacent said first and second control knobs and being arranged to be moved in directions which are perpendicular to each other so as to enable said occupant to easily locate and correctly operate said third and fourth control knobs by hand.

6. A switch device according to claim 1, further including a motor wherein said plurality of switches include switches for respectively detecting the movement of said first control knob in a direction due to operation and detecting the same in another direction, said switches being arranged to control said motor for operating said seat in the forward and rearward directions.

7. A switch device according to claim 1, further including a first motor and a second motor wherein said plurality of switches include a switch for detecting the movement of an end portion of said first control knob in the upward direction and in the downward direction due to operation and another switch for detecting the movement of another end portion of the same, said switches being respectively arranged to control said first motor for vertically moving the front end portion of said seat cushion and said second motor for vertically moving the rear end portion of the same.

8. A switch device according to claim 1, further including a motor wherein said plurality of switches include switches for respectively detecting the movement of said second control knob in a direction due to operation and detecting the same in another direction, said switches being arranged to control said motor for tilting said seat back in the forward and rearward directions.

9. A switch device for a power driven seat of a vehicle having a seat cushion, a seat back and power sources for moving said seat cushion and said seat back, said switch device comprising:
   (a) a first control knob for controlling said seat cushion, having a three-dimensional shape which generally corrresponds to and represents the shape of said seat cushion so as to enable an occupant to easily locate and correctly operate said first control knob with a hand;
   (b) a second control knob for controlling said seat back, having a three-dimensional shape which generally corresponds to and represents the shape of said seat back and is capable of relatively moving with respect to said first control knob so as to enable said occupant to easily locate and correctly operate said second control knob by hand;
   (c) a contact unit for supporting each of said first and second control knobs and allowing said first and second control knobs to be movable by an operation of said occupant in the same direction as said occupant intends to move said seat cushion and said seat back;
   (d) a plurality of switches accommodated in said contact unit for independently detecting the movement of each of said first and second control knobs by the operation of said occupant and actuating power sources for moving said seat cushion and said seat back in accordance with the detected movement of each of said first and second control knobs;
   (e) a slider for supporting said first control knob and transmitting the movement of said first control knob in the forward and rearward directions, further including a switch for detecting an inclination of said slider wherein said slider includes a penetration hole and wherein a connection member for supporting said second control knob penetrates said slider through the penetration hole, the penetration hole having a sufficiently larger diameter than an outer diameter of said connection member so that said first control knob cannot be moved when said second control knob is moved due to the operation.

10. A switch device according to claim 9, wherein a switch for detecting the movement of said connection member is disposed below said slider.

11. A switch device according to claim 10, further including a motor wherein said first control knob is provided with a switch for detecting the movement of said second control knob due to operation and a signal line is drawn out from said switch toward said motor.

12. A switch for a power driven seat for a vehicle capable of operating said power driven seat having a slide mechanism for at least moving a seat cushion in the longitudinal direction of the vehicle, a front vertical mechanism and a rear vertical mechanism for moving the front and rear ends of said seat cushion in the vertical direction of the vehicle, a reclining mechanism for tilting the seat back and a driving means respectively provided for driving said mechanisms, said switch for a power driven seat for a vehicle comprising:

a first control knob for controlling said slide mechanism, said front vertical mechanism and said rear vertical mechanism, the operable directions of which are made to coincide with the directions of movements of the overall body of said seat cushion, the front end portion of said seat cushion and the rear end portion of said seat cushion, said first control knob having a three-dimensional shape which generally corresponds to and represents said seat cushion so as to enable an occupant to easily locate and correctly operate said front control knob by hand;

a second control knob for controlling said reclining mechanism, the operable direction of which is made to coincide with the direction of movement of said seat back, said second control knob having a three-dimensional shape which generally corresponds to and represents said seat back so as to enable said occupant to easily locate and correctly operate said second control knob by hand;

a contact unit having a plurality of contacts for operating each of said mechanisms in accordance with movement of said first and second control knobs;

a connection member for supporting said second knob on said contact unit which penetrates said first control knob so that each of said plurality contacts is independently switched by the operation of said first and second control knobs in each of the operating directions; and a slider acommodated in said contact unit supporting said first control knob to transmit the movement of said first control knob in order to enable at least one of said plurality of contacts to be switched in accordance with the movement of said slider.

13. A switch for a power driven seat for a vehicle according to claim 12, wherein said switch for a power driven seat is secured to an upward facing portion of said seat cushion, and said first and second control knobs are respectively disposed in positions corresponding to and representing the positions of said seat cushion and said seat back, and is moved integrally with said seat cushion.

14. A switch for a power driven seat for a vehicle according the claim 12, wherein a plurality of switches for operating sub-functions and the operating directions of which are arranged to be different between neighboring switches are disposed in the vicinity of said first and second control knobs.

15. A switch for a power driven, seat for a vehicle according to claim 12, further includes a control-knob neutral maintaining means, for independently supporting said first control knob and said second control knob at non-contact portions of each of said contacts when said first control knob and said second control knob are not being operated.

16. A switch device for a power driven seat having a seat cushoin and a seat back supported to said seat cushion and arranged to be relatively moved with respect to said seat cushion and motors for respectively adjusting the positions of said seat cushion and said seat back, said switch device for a power driven seat comprising:

(a) a first control knob for controlling said seat cushion, which is in the form of a relatively flat three-dimensional shape so as to enable an occupant to easily locate and correctly operate said first control knob by hand;

(b) a second control knob for controlling said seat back, which is supported by a connection member penetrating said first control knob, so that said second control knob projects over said first control knob and can be moved relative to said first control knob;

(c) transmitting means for transmitting the movement of said first control knob;

(d) a first switch for detecting movement of said first control knob in a desired moving direction of said seat cushion due to the operation of said occupant by detecting movement of said transmitting means, said first switch operated by said transmitting means in accordance with the detected movement of said first swich so as to move said seat cushion in said desired direction by controlling a motor for driving said seat cushion in accordance with the detected movement of said first control knob; and (e) a second switch for detecting a movement of said second control knob in a desired moving direction of said seat back due to the operation of the occupant so as to move said seat back in said desired direction by controlling a motor for driving said seat back in accordance with the detected movement of said second control knob.

17. switch device according to claim 16, wherein said first switch for said first control knob comprises a pair of limit switches for respectively detecting the opposite directional movements of said first control knob and said second switch comprises a pair of limit switches for respectively detecting opposite directional movements of said second control knob.

18. A switch device for a power driven seat of a vehicle comprising:

(a) a control knob for controlling said power driven seat;

(b) a slider driven by said knob for transmitting movement of said control knob;

(c) a plurality of contacts switched by said slider in accordance with the movements of said control knob;

(d) first guiding means for guiding linearly said slider to one direction of the vehicle, said slider being moved along said first guiding means so that said slider operates any of said contacts to drive a motor adjusting a position of the seat forward or backward in relation to the vehicle;

(e) second guiding means for guiding said slider to a direction of substantially right angles to said first guiding means, said slider being moved along said second guiding means so that said slider operates any of the other contacts to drive a motor adjusting a position of the seat upward or downward in relation to the vehicle; and wherein said first and second guiding means have at least one recessed portion and at least one ball, respective to each recessed portion, movable along the recessed portion provided on said first and second guiding means, the recessed portion of the first guiding means being longitudinally placed at right angles to the recessed portion of the second guiding means so that said ball is allowed to fall into said recessed portion which results in maintaining said slider at a non-contact position when said slider is not driven by said control knob.

19. A switch device according to claim 18, wherein said first guiding means have a pair of first recessed portions each of which is longitudinally placed on one line or parallel to each other and respectively a ball movable longitudinally into the pair of first recessed portion.

20. A switch device according to claim 19, wherein said second guiding means have a second recessed portion intersected longitudinally with said first recessed portion and respectively a ball movable longitudinally into the second recessed portion.

21. A switch device according to claim 20, wherein the second recessed portion is placed between the pair of first recessed portions.

22. A switch device for a power driven seat of a vehicle having a seat cushion, a seat back and power sources for moving said seat cushion and said seat back, said switch device comprising:

(a) a first control knob for controlling said seat cushion, having a three-dimensional shape which generally corresponds to and represents the shape of said seat cushion so as to enable an occupant to easily locate and correctly operate said first control knob with a hand;

(b) a second control knob for controlling said seat back, having a three-dimensional shape which generally corresponds to and represents the shape of said seat back and is capable of relatively moving with respect to said first control knob so as to enable said occupant to easily locate and correctly operate said second control knob by hand;

(c) a contact unit for supporting each of said first and second control knobs and allowing said first and second control knobs to be movable by an operation of said occupant in the same directions as said occupant intends to move said seat cushion and said seat back;

(d) a connection member for supporting said second knob on said contact unit which penetrates said first control knob;

(e) a plurality of switches acconmmodated in said contact unit for independently detecting the movement of each of said first and second control knobs by the operation of said occupant and actuating power sources for moving said seat cushion and said seat back in accordance with the detected movement of each of said first and second control knobs.

* * * * *